(12) United States Patent
Hochstetler et al.

(10) Patent No.: US 9,472,996 B2
(45) Date of Patent: Oct. 18, 2016

(54) TERMINAL ASSEMBLY

(71) Applicant: Hamilton Sundstrand Corporation, Windsor Locks, CT (US)

(72) Inventors: Derek R. Hochstetler, Loves Park, IL (US); Jan Henry Abels, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 750 days.

(21) Appl. No.: 13/862,650

(22) Filed: Apr. 15, 2013

(65) Prior Publication Data

US 2014/0306560 A1 Oct. 16, 2014

(51) Int. Cl.
*H02K 5/22* (2006.01)
*H02K 15/14* (2006.01)

(52) U.S. Cl.
CPC .............. *H02K 5/225* (2013.01); *H02K 15/14* (2013.01); *Y10T 29/49147* (2015.01)

(58) Field of Classification Search
CPC ................................................... H02K 5/225
USPC .................................. 310/71; 439/709, 135
See application file for complete search history.

(56) References Cited

U.S. PATENT DOCUMENTS

| | | | |
|---|---|---|---|
| 3,045,171 A | 7/1962 | Heins et al. | |
| 3,808,489 A | 4/1974 | Albright et al. | |
| 3,849,731 A | 11/1974 | Morita et al. | |
| 4,029,978 A | 6/1977 | Jager et al. | |
| 4,140,934 A | 2/1979 | Jager et al. | |
| 4,199,700 A | 4/1980 | Daugherty et al. | |
| 4,254,352 A | 3/1981 | Fidei et al. | |
| 4,712,029 A | 12/1987 | Nold | |
| 5,122,696 A | 6/1992 | Shih et al. | |
| 5,358,432 A | 10/1994 | Shih et al. | |
| 5,523,635 A | 6/1996 | Ferreira et al. | |
| 5,949,167 A | 9/1999 | Blalock et al. | |
| 6,084,324 A | 7/2000 | Jeske | |
| 6,392,323 B1 | 5/2002 | Parker | |
| 6,424,063 B1 | 7/2002 | Whitener et al. | |
| 6,501,201 B1 | 12/2002 | Whitener et al. | |
| 6,528,917 B2 | 3/2003 | Shimamoto et al. | |
| 6,538,339 B2 | 3/2003 | Krizek et al. | |
| 6,628,024 B1 | 9/2003 | Mirmobin | |
| 6,681,477 B2 | 1/2004 | Shimamoto et al. | |
| 6,897,584 B2 | 5/2005 | Doherty et al. | |
| 7,521,829 B2 | 4/2009 | Semba et al. | |
| 7,728,473 B2 | 6/2010 | Semba et al. | |
| 2005/0001494 A1* | 1/2005 | Kuribayashi | H02K 5/225 310/71 |
| 2012/0190250 A1* | 7/2012 | Patel | H02K 5/225 439/709 |
| 2012/0228970 A1* | 9/2012 | Patel | H02K 5/225 310/71 |

* cited by examiner

Primary Examiner — Terrance Kenerly
(74) Attorney, Agent, or Firm — Kinney & Lange, P.A.

(57) ABSTRACT

A terminal board includes a base portion with a length; a plurality of terminals extending from the base portion; and a plurality of barriers extending from the base portion between terminals and having a barrier spacing distance between each barrier. The ratio of length to barrier spacing distance is at least 5.124:1. The terminal board can be connected to a starter-generator housing for outputting power from the starter-generator.

20 Claims, 9 Drawing Sheets

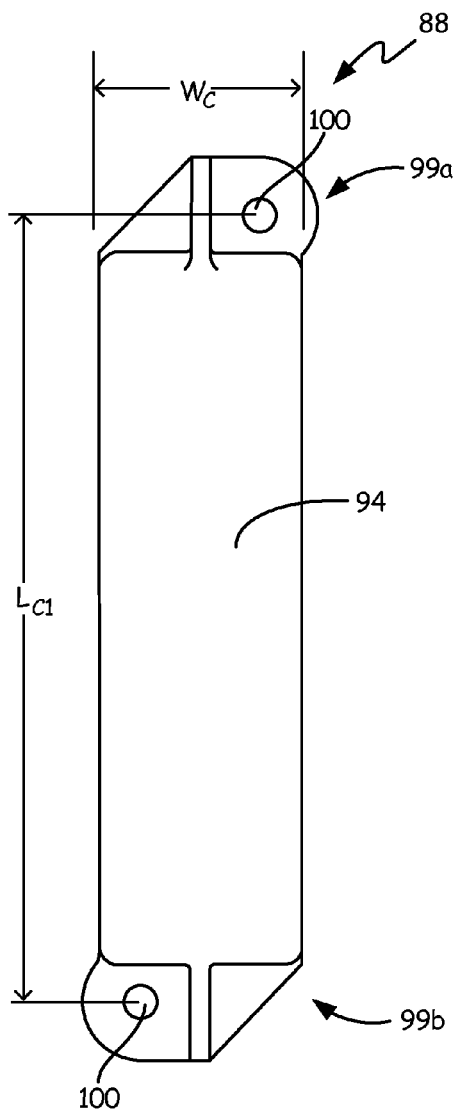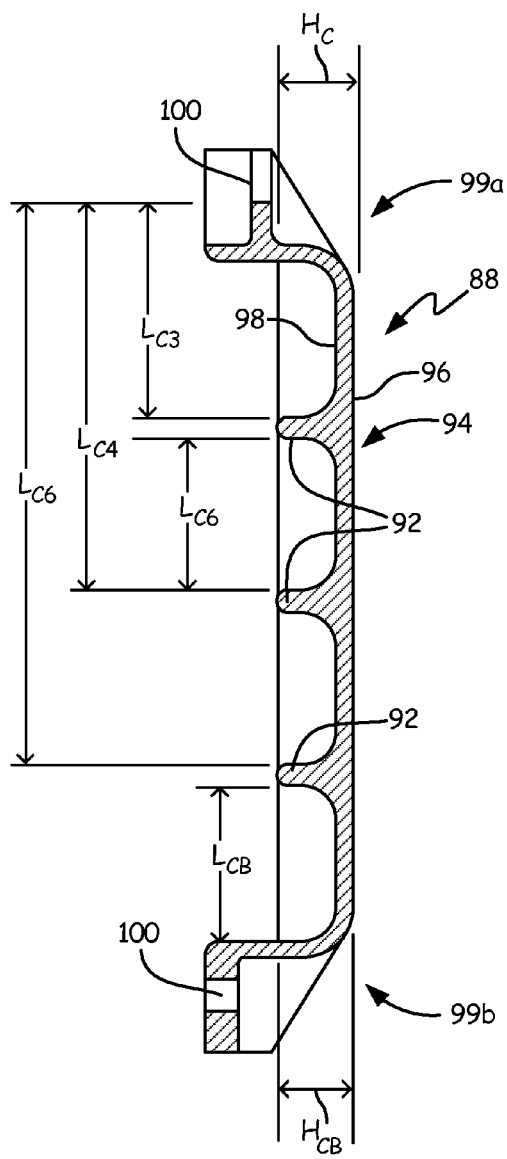
FIG. 8D
FIG. 8E

TERMINAL ASSEMBLY

BACKGROUND

The present disclosure relates to rotating electrical machines such as high speed starter generators for gas turbine engines and, more particularly, to a terminal board assembly used to transmit electrical energy therefor.

An aircraft may include various types of rotating electrical machines such as, for example, generators, motors, and starter/generators. Starter/generators may be operated as either a starter or a generator.

The electrical power output from, or supplied to, the starter-generator may be communicated via one or more terminal assemblies. Each terminal assembly may include feedthroughs that are coupled to stator output leads within the generator housing and to a terminal block assembly outside of the generator housing.

Terminal assemblies are designed to provide various clearances, such as "strike" performance, breakthrough performance and creepage performance. Creepage is typically the shortest path between two conductive components or between a conductive component and a bounding surface measured along the surface of the insulating material. A proper and adequate creepage distance protects against tracking, a process that produces a partially conducting path of localized deterioration on the surface of the insulating material as a result of electric discharges on or close to an insulation surface. In some instances, collection of foreign object debris near the terminal assembly may potentially affect performance with regards to clearance and creepage.

SUMMARY

A terminal board includes a base portion with a length; a plurality of terminals extending from the base portion; and a plurality of barriers extending from the base portion between terminals and having a barrier spacing distance between each barrier. The ratio of length to barrier spacing distance is at least 5.124:1.

A method of installing a terminal assembly includes mounting a terminal board with a plurality of terminals and a plurality of barriers to a housing; aligning a terminal block cover over the terminal board to cover terminals on the terminal board; and securing the terminal block cover to the terminal board. The terminal board has a ratio of length to barrier spacing of at least 5.124:1.

BRIEF DESCRIPTION OF THE DRAWINGS

FIG. 8D is a perspective view of the terminal block cover.

FIG. 8E is a cross-sectional view of the terminal block cover.

DETAILED DESCRIPTION

Figure 1:
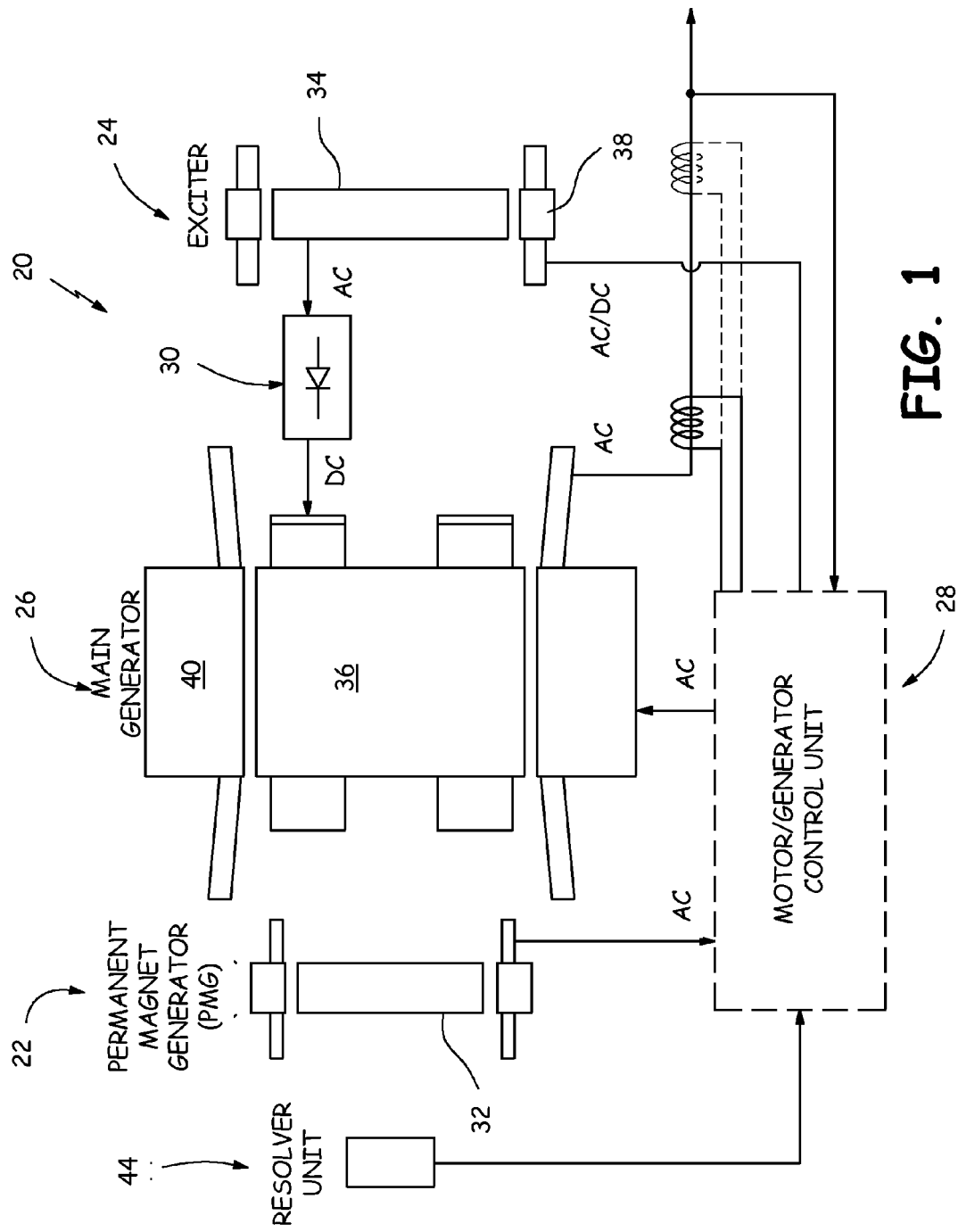
FIG. 1 is a functional schematic block diagram of a synchronous starter-generator system.

FIG. 1 schematically illustrates a functional block diagram of one embodiment of a starter/generator system 20. This starter/generator system 20, which is commonly known as a brushless AC starter/generator, includes a permanent magnet generator (PMG) 22, an exciter 24, a main/generator 26, a starter/generator control unit 28, and one or more rectifiers 30. The starter/generator system 20 may be used as a starter/generator for a gas turbine engine in aircraft, space, marine, land or other vehicle-related applications where gas turbine engines are used. For aircraft applications, gas turbine engines are used for propulsion (e.g., the aircraft's main engines) and/or for power (e.g., the auxiliary power unit (APU)). It is to be appreciated, however, that the present invention is not limited to use in conjunction with a specific type of electrical machine. Thus, although the present invention is, for convenience of explanation, depicted and described as being implemented in a starter/generator, it will be appreciated that it can be implemented in other electric machines.

When the starter/generator system 20 is operating as a generator, a rotor 32 of the PMG 22, a rotor 34 of the exciter 24, and a rotor 36 of the main starter/generator 26 all rotate. As the PMG rotor 32 rotates, the PMG 22 generates and supplies AC power to the starter/generator control unit 28, which in turn supplies direct current (DC) power to a stator 38 of the exciter 24. The exciter rotor 34 in turn supplies AC power to the rectifier 30. The output from the rectifier 30 is DC power and is supplied to the main starter/generator rotor 36, which in turn outputs AC power from a main starter/generator stator 40. The starter/generator system 20 may supply output power at a variety of frequencies, or alternatively, a gearing system may be used to operate the starter/generator at a constant speed and, thus, supply a constant frequency. The output power from the main starter/generator stator 40 is typically three-phase AC power.

When the starter/generator system 20 is in operation as a starter motor, AC power is supplied to the exciter stator 38 and the main starter/generator stator 40 from, for example, an AC power supply section in the starter/generator control unit 28 to cause the main starter/generator rotor 36 to rotate. As the main starter/generator rotor 36 rotates, the PMG rotor 32 and exciter rotor 34 also rotate. A position sensing device, such as a resolver 44, may also be included in the starter/generator system 20 to supply a signal representative of the main starter/generator rotor 36 position to the starter/generator control unit 28. This position signal is used to control the AC power supplied to the main starter/generator stator 40 and to the exciter 24 such that the maximum torque is generated.

Figure 2:
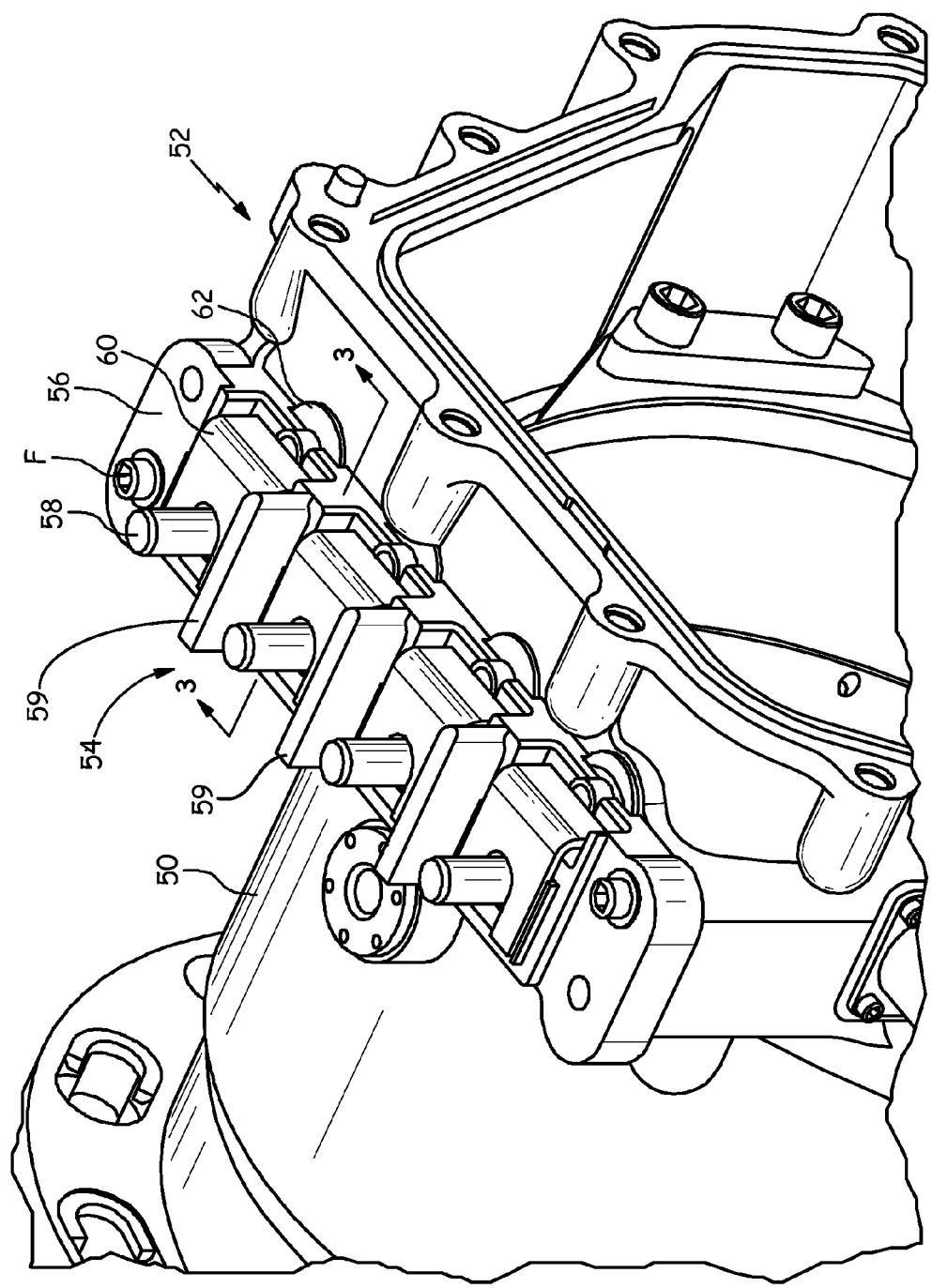
FIG. 2 is a perspective view of the starter generator housing and terminal board assembly.

With reference to FIG. 2, the starter/generator system 20 may be housed within a generator housing 50 having a terminal housing section 52. The terminal housing section 52 may be an integral part of the generator housing 50, or may be a separate part mounted thereto. In either case, the terminal housing section 52 provides the electrical interface to external equipment and systems. In particular, one or more terminal assemblies 54 are each mounted to the generator housing 50 in the terminal housing section 52 and provide the electrical interface.

The terminal assembly 54 generally includes a terminal board 56 which contains one or more terminal posts 58 separated by barriers 59. Terminal posts 58 support terminal connections 60 and passthroughs 62 (also illustrated in FIG. 3). The terminal board 56 is mounted to the housing 50 through fasteners F such as bolts or the like which are threaded into the housing 50. The terminal board 56, barriers 59 and passthroughs 62 may be manufactured of a non-metallic material such as Torlon® Polyamid plastic while the terminal posts 58 and terminal connections 60 are manufactured of electrically conductive materials such as steel alloy or copper alloy respectively.

Figure 3:
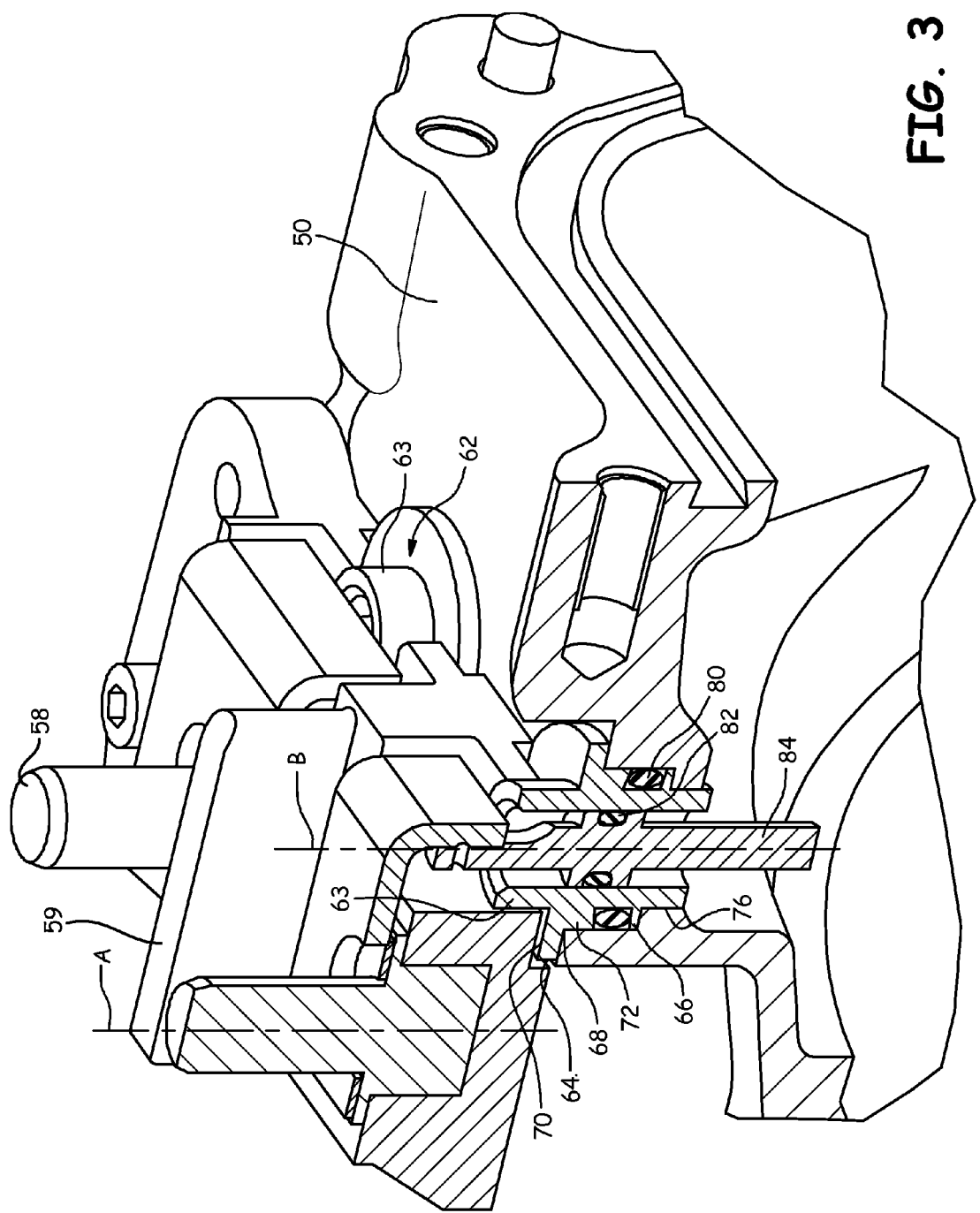
FIG. 3 is a sectional view of a terminal assembly along line 3-3 in FIG. 2.
Figure 4:
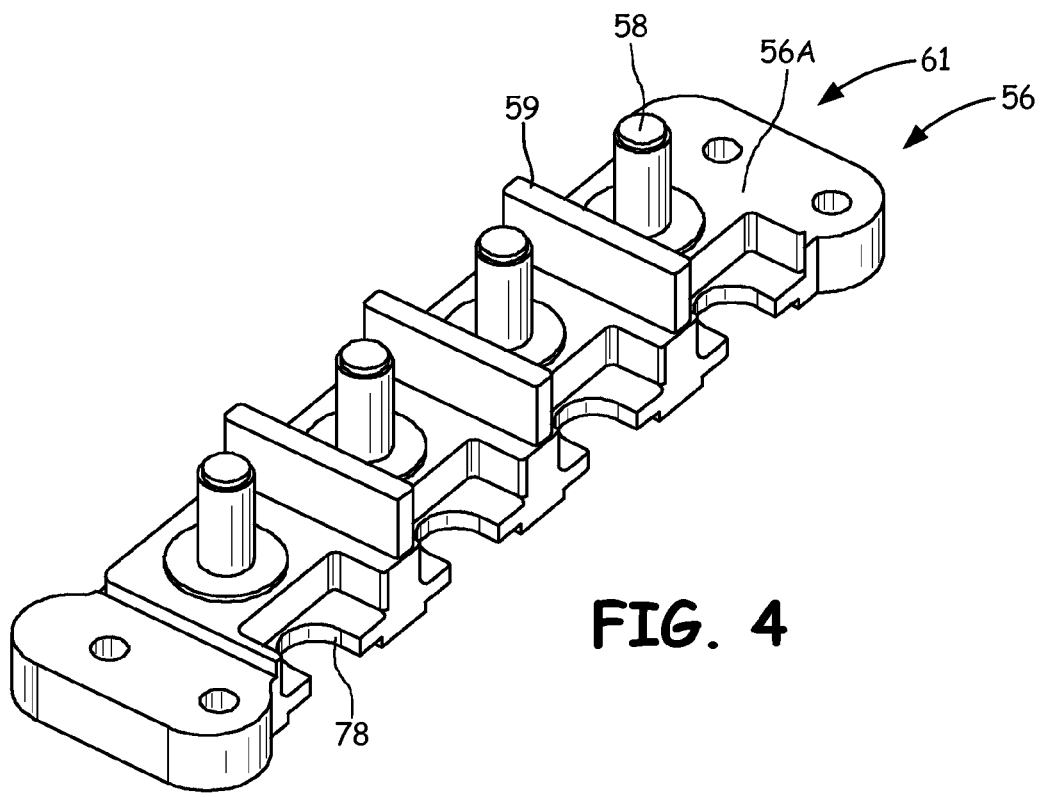
FIG. 4 is a top view of a terminal board of the terminal assembly.
Figure 5:
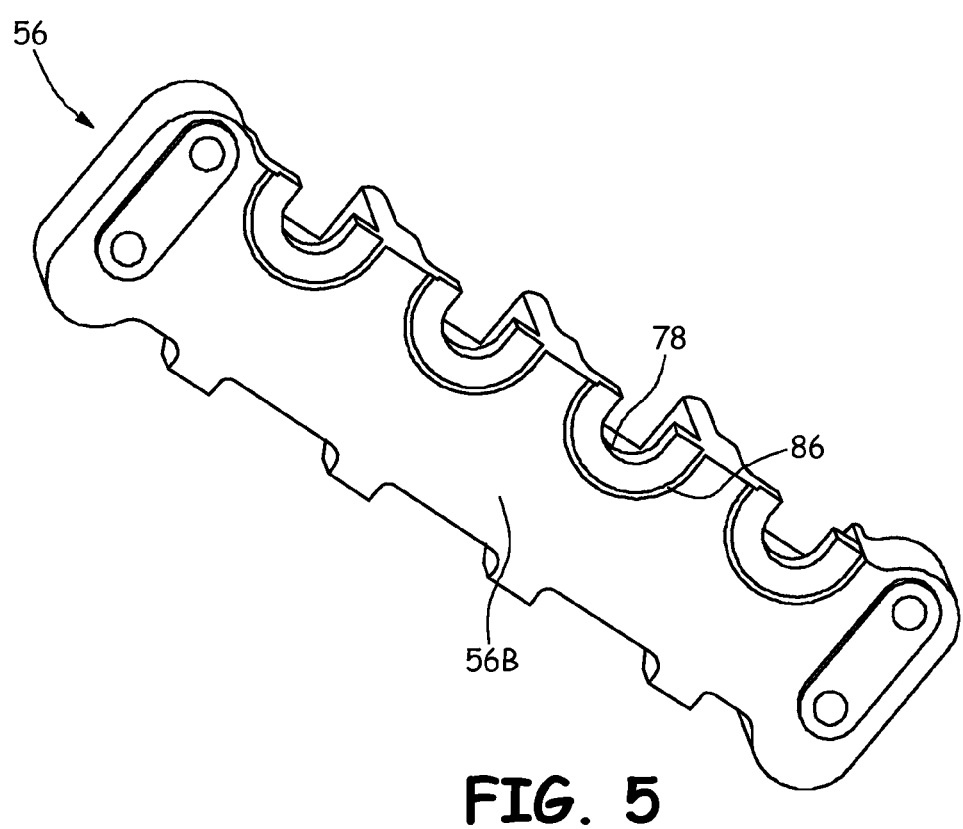
FIG. 5 is a bottom view of the terminal board of the terminal assembly.

The terminal posts 58 extend from one side 56A (FIG. 4) of the terminal board 56 and the passthroughs 62 are engaged with an opposite side 56B (FIG. 5) of the terminal board 56. In one disclosed non-limiting embodiment, the terminal posts 58 are offset from the passthroughs 62 (FIG. 3). That is, the terminal posts 58 are defined along a first axis A and the passthroughs 62 are defined along a second axis B. The terminal connections 60 extend through the passthroughs 62 and are in electrical contact with the terminal posts 58.

Figure 6:
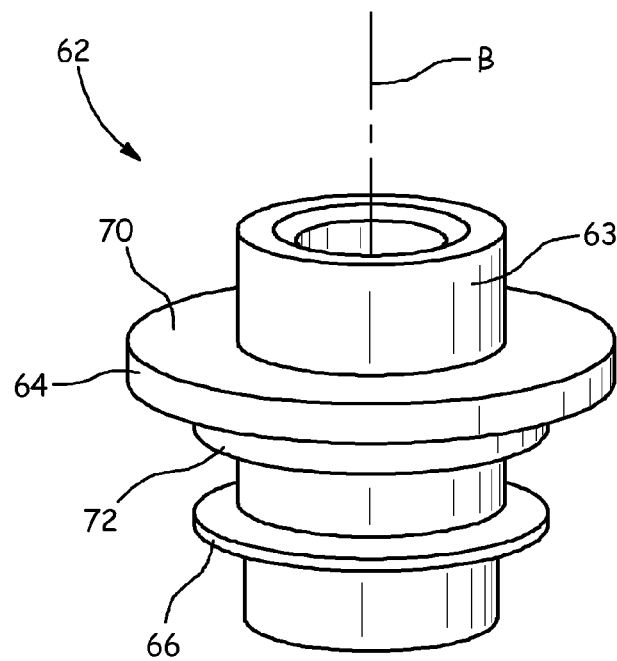
FIG. 6 is a perspective view of a feedthrough of the terminal assembly.
Figure 7:
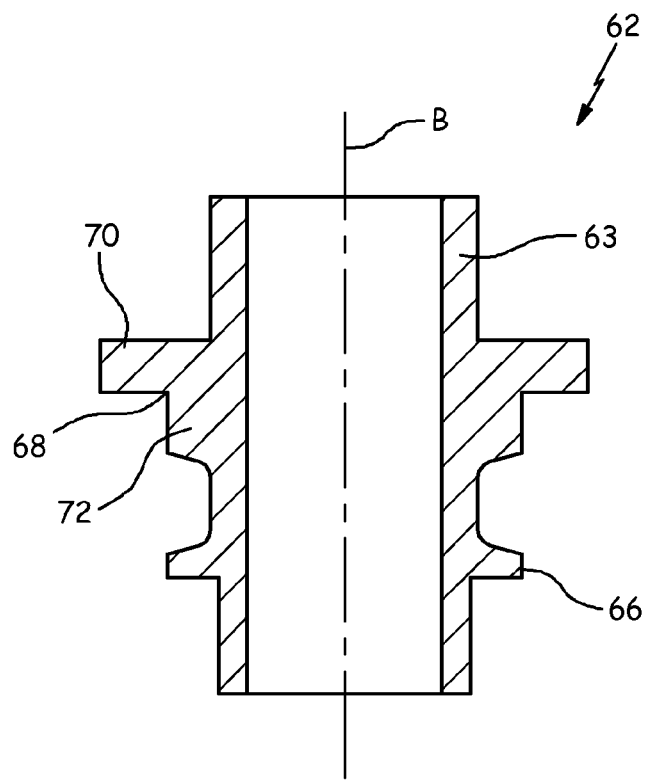
FIG. 7 is a sectional view of a feedthrough of the terminal assembly.

With reference to FIG. 3, each passthrough 62 includes a generally annular body 63 with a first radially extending flange 64 and a second radially extending flange 66 (FIG. 6). The first radially extending flange 64 includes a stepped surface 68 (FIG. 7) between a first radially extending flange section 70 that is of a diameter greater than the second radially extending flange 66 and a second radially extending flange section 72 which is of a diameter generally equivalent to the second radially extending flange 66.

The second radially extending flange section 72 and the second radially extending flange 66 are received within a bore 76 in the housing 50 such that the first radially extending flange section 70 covers a portion of the housing 50 and increase the creep path from the terminal connection 60 to the housing 50. That is, the first radially extending flange section 70 extends beyond the diameter of the bore 76. A first seal 80, such as an O-ring, may be positioned around the passthrough 62 between the second radially extending flange section 72 and the second radially extending flange 66 providing a leak tight seal between the inside and outside of the generator housing 50 to contain oil therein. A second seal 82, such as an O-ring, may also be positioned around a pin 84 of the terminal connection 60 and the passthrough 62 to facilitate the leak tight seal between the inside and outside of the generator housing 50. It should be understood that the pin 84 at terminal connection 60 may be a unitary component which is welded or otherwise joined together.

The terminal board 56 includes a multiple of interrupted apertures 78 (FIGS. 4-5) which each receive the generally annular body 63 of the passthrough 62. The opposite side 56 of the terminal board 56 also includes an interface 86 in one disclosed non-limiting embodiment may include semi-circular recessed areas defined about the interrupted aperture 78 which receive each of the first radially extending flange sections 70 to further orient and restrain each passthrough 62 with respect to the terminal board 56.

Figure 8A:
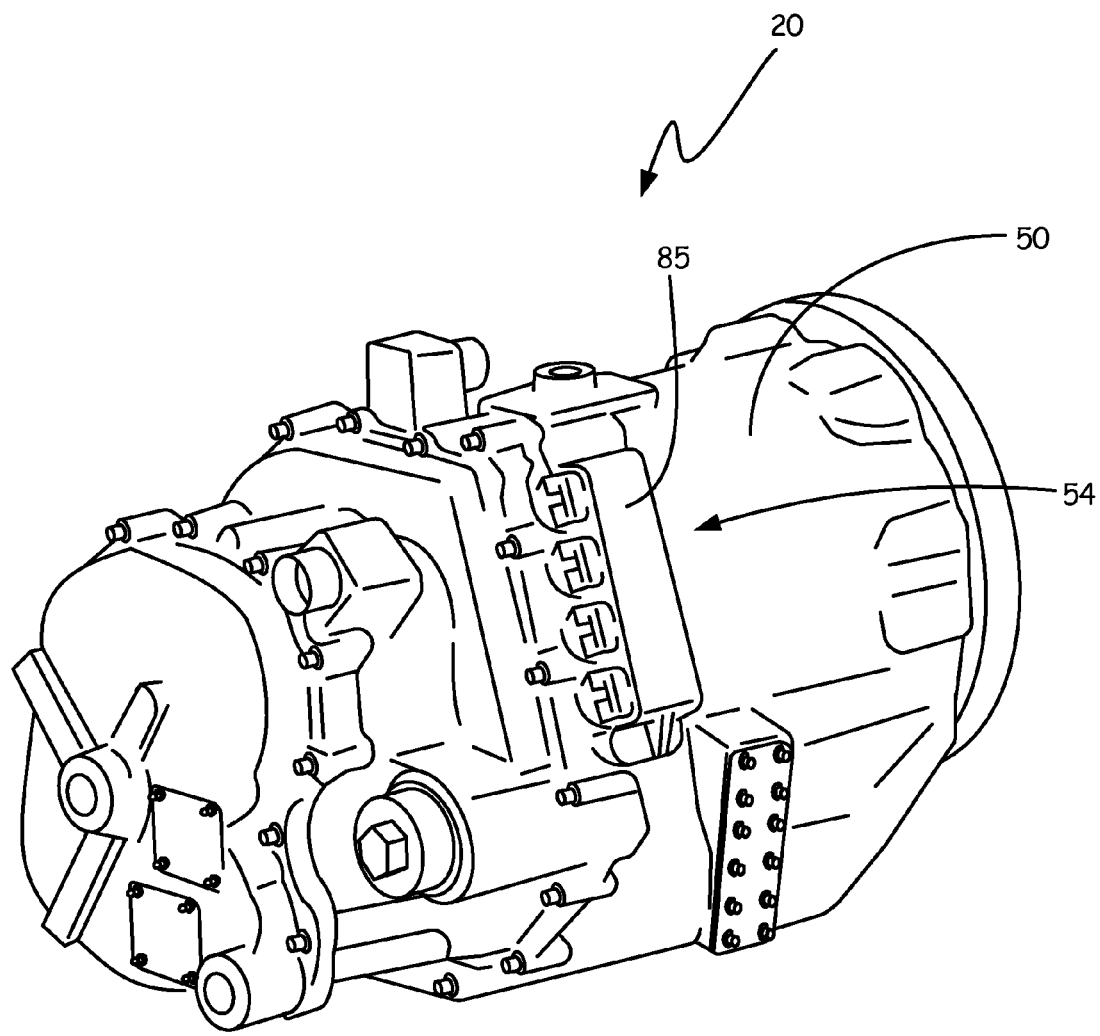
FIG. 8A is a perspective view of a starter generator housing and terminal board assembly with a terminal block cover.
Figure 8B:
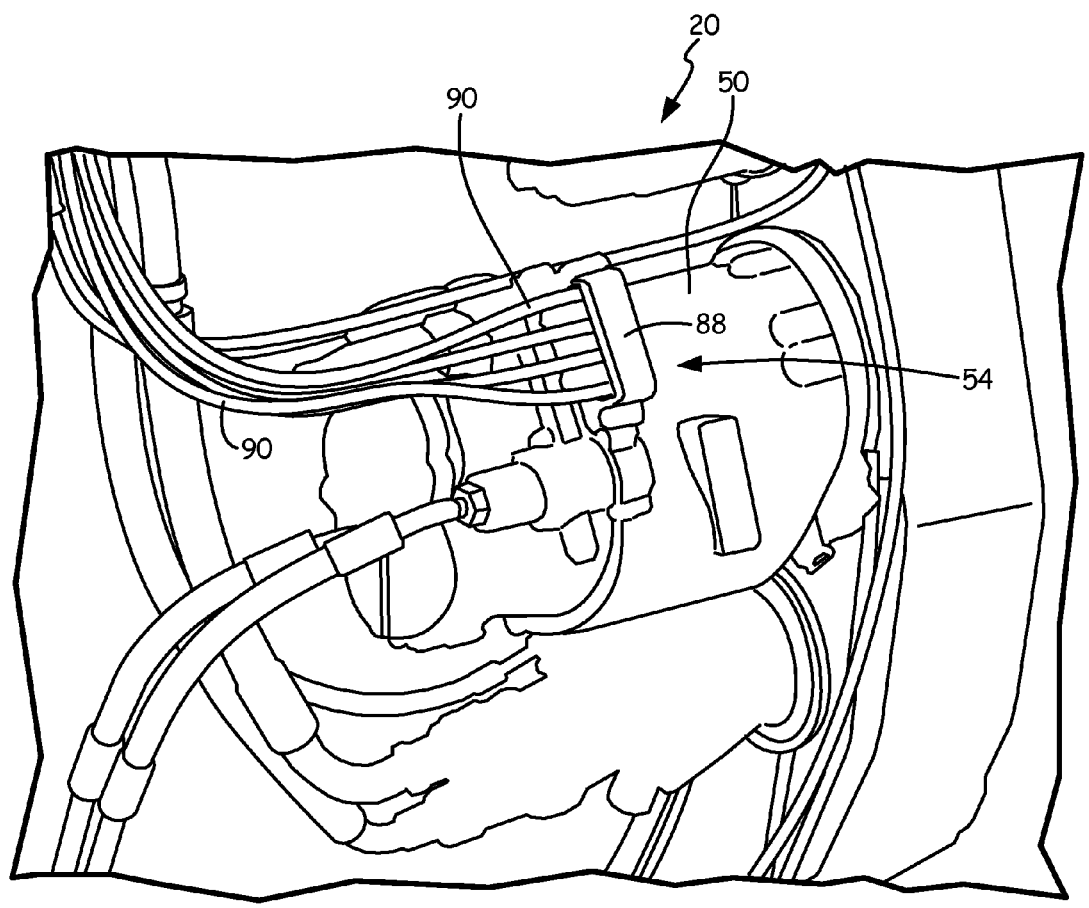
FIG. 8B is a perspective view of the starter generator housing with feeders connected to the terminal assembly.
Figure 8C:
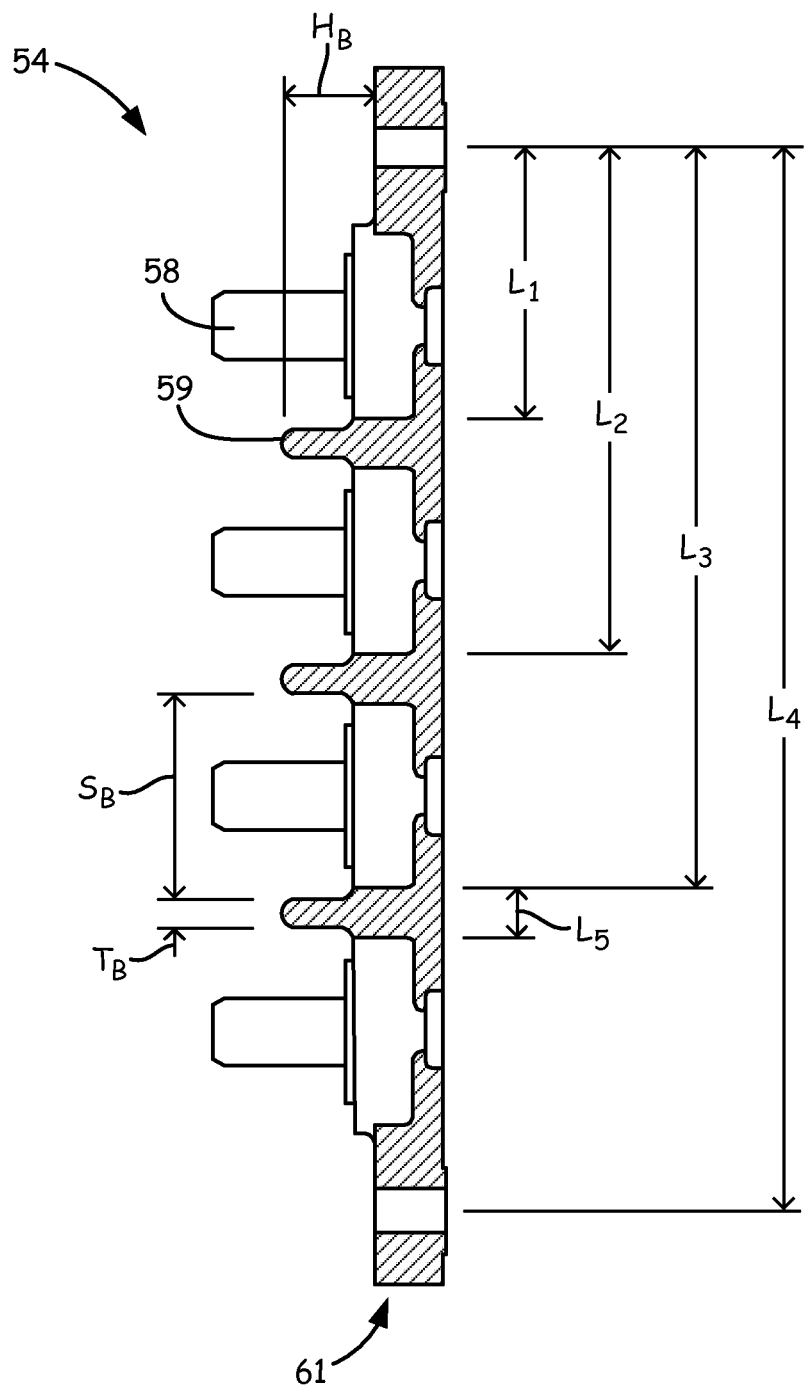
FIG. 8C is a cross-sectional view of a terminal block.

FIG. 8A is a perspective view of starter/generator housing 50 and terminal assembly 54 with a terminal block cover 88. FIG. 8B is a perspective view of the starter/generator housing 50 with feeders 90 connected to terminal assembly 54. FIG. 8C is a cross-sectional view of terminal board 56.

FIG. 8D is a perspective view of terminal block cover 88, and FIG. 8E is a cross-sectional view of the terminal block cover 88.

Terminal block cover 88 includes barriers 92, which can correspond to barriers 59 of terminal board 56. Terminal block cover 88 is generally made of a rectangular top portion 94 with an outer surface 96 and an inner surface 98, and retention portions 99a, 99b which extend from the ends of rectangular top portion 94. Barriers 92 extend from inner surface 98. Retention portions 99a, 99b can contain apertures 100 for receiving fastensers, for example a screw or bolt. Terminal block cover 88 dimensions include width $W_C$ of 3.886 cm (1.53 inches), length $L_{C1}$ of 15.250 cm (6.004 inches), length $L_{C2}$ of 0.732 cm (0.288 inches), length $L_{C3}$ of 4.049 cm (1.594 inches), length $L_{C4}$ of 7.424 cm (2.923 inches), length $L_{C5}$ of 10.800 cm (4.252 inches), barrier 92 length $L_{CB}$ of 0.399 cm (0.157 inches), height $H_C$ of 2.845 cm (1.120 inches) and barrier 92 height $H_{CB}$ of 1.455 cm (0.573 inches). The spacing between terminal barriers 92 $L_{C6}$ is 2.976 cm (1.172 inches), and thus, the ratio of length of terminal block cover 88 to barrier 92 spacing is 15.250:2.976 or 5.124:1. Terminal block cover 88 may be manufactured of a non-metallic material, such as Torlon® Polyamid plastic Terminal board 56 includes a base portion 61 and barriers 59. Dimensions shown include length $L_1$ of 3.891 cm (1.532 inches), length $L_2$ of 7.267 cm (2.861 inches), length $L_3$ of 10.643 cm (4.190 inches), length $L_4$ of 15.250 cm (6.004 inches), $L_5$ of 0.714 cm (0.281 inches), barrier 59 thickness $T_B$ of 0.399 cm (0.157 inches), barrier 59 spacing $S_B$ of 2.976 cm (1.172 inches), and barrier 59 height $H_B$ of 1.334 cm (0.525 inches). A ratio of terminal board 56 length to barrier 59 spacing is 15.250:2.662 or 5.124:1.

Feeders 90 connect to terminal connections 60 and are retained by a fastener on terminal posts 58. Feeders 90 carry output power from starter/generator 20, and can be cable, wire or other similar devices. Terminal block cover 88 connects to and covers terminal board 56 and feeder 90 connections after feeders 90 have been connected to terminal board 56. Terminal block cover 88 can connect to terminal board 56 and/or housing 50 through fasteners, for example screws or bolts.

Terminal block cover 88 helps to isolate connections between feeders 90 by increasing clearance between feeders 90 and improving the physical shielding of the terminals through the use of barriers 92 which match up with barriers 59. The ratio of overall length of cover 88/terminal board 56 to barrier 59, 92 spacing provides the clearance needed for isolating connections.

As aircraft or other systems using starter/generator 20 get larger and require more power, terminal connections 60 and terminal posts 58 must expand to be able to accommodate the larger feeders 90 required to carry the larger amounts of output power from starter/generator 20. Terminal assembly 54 with terminal board 56 and terminal block cover 88 disclosed herein increases clearance between conducting materials and also improves the physical shielding of the larger terminals by increasing length of the terminal board 56 and cover 88 as well as increasing barrier 59, 92 spacing between terminals 58, resulting in a ratio of overall length to barrier spacing of about 5.124:1. This improves clearance performance and creepage performance by lengthening or extending the path over the surface of the non-conducting material. By lengthening terminal board 56 and terminal block cover 88 as well as increasing barrier 59, 92 spacing, terminal assembly 54 sufficiently isolates all electric conducting components from housing 50 to prevent electrical arcing.

It should be understood that like reference numerals identify corresponding or similar elements throughout several drawings. It should also be understood that although a particular component arrangement is disclosed in the illustrated embodiment, other arrangements will benefit herefrom.

Although particular step sequences are shown, described and claimed, it should be understood that steps may be performed in any order, separated or combined unless otherwise indicated and will still benefit from the present disclosure.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A terminal board comprising:
    a base portion with a length;
    a plurality of terminals extending from the base portion; and
    a plurality of barriers extending from the base portion between terminals and having a barrier spacing distance between each barrier; wherein the ratio of length to barrier spacing distance is at least 5.124:1.

2. The terminal board of claim 1, wherein the at least one barrier extends from base portion at least 1.334 cm (0.525 inches).

3. The terminal board of claim 1, wherein the at least one barrier has a thickness of at least 0.399 cm (0.157 inches).

4. The terminal board of claim 1, wherein the terminal board base has four terminals and three barriers.

5. The terminal board of claim 1, wherein the terminal board length is at least 15.250 cm (6.004 inches).

6. A terminal assembly comprising:
    a terminal board with a plurality of terminals and at least one terminal board barrier separating each of the plurality of terminals, the terminal board having a length of at least 15.250 cm (6.004 inches); and
    a terminal cover to cover the terminal board and having at least one cover barrier extending from an inside of the terminal cover.

7. The terminal assembly of claim 6, wherein the at least one terminal board barrier extends from the terminal board at least 1.334 cm (0.525 inches).

8. The terminal assembly of claim 6, wherein the at least one terminal board barrier has a thickness of at least 0.399 cm (0.157 inches).

9. The terminal assembly of claim 6, wherein the terminal board has four terminals and three terminal board barriers.

10. The terminal assembly of claim 9, wherein the terminal cover has three cover barriers that align with the three terminal board barriers.

11. The terminal assembly of claim 6, wherein the terminal cover connects to the terminal board with fasteners.

12. The terminal assembly of claim 6, wherein the terminal board has a plurality of barriers and the ratio of length to barrier spacing is at least 5.124:1.

13. A starter-generator comprising:
    a housing;
    a terminal board with an overall length mounted to the housing with a plurality of terminals and a plurality of terminal board barriers separated by barrier spacing lengths; and
    a terminal cover to mount over the terminal board, the terminal cover with a plurality of cover barriers aligned with and extending toward the plurality of terminal board barriers, wherein the ratio of overall terminal board length to barrier spacing lengths is at least 5.124:1.

14. The starter-generator of claim 13, wherein each of the plurality of terminal board barriers extends from the terminal board at least 1.334 cm (0.525 inches).

15. The starter-generator of claim 13, wherein each of the plurality of terminal board barriers has a thickness of at least 0.399 cm (0.157 inches).

16. The starter-generator of claim 13, wherein the terminal board has four terminals and three terminal board barriers.

17. The starter-generator of claim 16, wherein the terminal cover has three cover barriers that align with the three terminal board barriers.

18. The starter-generator of claim 13, wherein the terminal board overall length is at least 15.250 cm (6.004 inches).

19. A method of installing a terminal assembly, the method comprising:
    mounting a terminal board with a plurality of terminals and a plurality of barriers to a housing, the terminal board with a ratio of length to barrier spacing of at least 5.124:1;
    aligning a terminal block cover over the terminal board to cover terminals on the terminal board; and
    securing the terminal block cover to the terminal board.

20. The method of claim 19, wherein the step of aligning the terminal block cover over the terminal board further comprises:
    aligning a plurality of barriers extending from the terminal board cover with each the plurality of barriers extending from the terminal board.

* * * * *